United States Patent
Molstad et al.

(10) Patent No.: US 7,035,040 B2
(45) Date of Patent: Apr. 25, 2006

(54) SEQUENCED TIME-BASED SERVO TECHNIQUES

(75) Inventors: Richard W. Molstad, St. Paul, MN (US); Alan R. Olson, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 235 days.

(21) Appl. No.: 10/439,579

(22) Filed: May 16, 2003

(65) Prior Publication Data

US 2004/0228020 A1 Nov. 18, 2004

(51) Int. Cl.
*G11B 5/584* (2006.01)
*G11B 5/09* (2006.01)
(52) U.S. Cl. .................. 360/77.12; 360/48; 360/77.13
(58) Field of Classification Search ............... 360/48, 360/77.12, 77.13, 77.01, 77.07, 77.08
See application file for complete search history.

(56) References Cited

U.S. PATENT DOCUMENTS

| | | | |
|---|---|---|---|
| 4,209,810 A * | 6/1980 | Ragle et al. ............ 360/77.06 |
| 5,119,248 A * | 6/1992 | Bizjak et al. ................ 360/75 |
| 5,321,570 A * | 6/1994 | Behr et al. .................. 360/121 |
| 5,689,384 A | 11/1997 | Albrecht et al. |
| 6,021,013 A | 2/2000 | Albrecht et al. |
| 6,134,070 A | 10/2000 | Tran et al. |
| 6,241,674 B1 | 6/2001 | Phillips et al. |
| 6,271,786 B1 | 8/2001 | Huff et al. |
| 6,312,384 B1 | 11/2001 | Chiao |
| 6,363,107 B1 | 3/2002 | Scott |
| 6,381,261 B1 | 4/2002 | Nagazumi |
| 6,385,268 B1 | 5/2002 | Fleming et al. |
| 6,400,754 B1 | 6/2002 | Fleming et al. |
| 2001/0053174 A1 | 12/2001 | Fleming et al. |
| 2002/0093640 A1 | 7/2002 | Watanabe et al. |

* cited by examiner

*Primary Examiner*—David Hudspeth
*Assistant Examiner*—Varsha A. Kapadia
(74) *Attorney, Agent, or Firm*—Eric D. Levinson

(57) ABSTRACT

The invention is directed to servo techniques that make use of sequences of servo marks, rather than individual marks for generation of position error signals. In particular, random or pseudo-random sequences of servo marks may be recorded on the medium in an overlapping fashion. For example, a first sequence of marks and a second sequence of marks may overlap in the servo track. The second sequence may be substantially non-correlated with the first sequence, and may be recorded in an offset location along the track relative to the first sequence. Different correlators can be used to detect the different sequences, and position error signals can be generated based on timings associated with the detection of the first sequence relative to the second sequence.

24 Claims, 7 Drawing Sheets

SEQUENCED TIME-BASED SERVO TECHNIQUES

TECHNICAL FIELD

The invention relates to data storage media and, more particularly, to data storage media that make use of servo patterns.

BACKGROUND

Data storage media are commonly used for storage and retrieval of data, and come in many forms, such as magnetic tape, magnetic disks, optical tape, optical disks, holographic disks or cards, and the like. In magnetic media, data is typically stored as magnetic signals that are magnetically recorded on the medium surface. The data stored on the medium is often organized along "data tracks," and transducer heads are positioned relative to the data tracks to write data to the tracks or read data from the tracks. A typical magnetic storage medium, such as magnetic tape, typically includes several data tracks. Optical media, holographic media and other media formats may also make use of data tracks.

As the number of data tracks on a medium increases, the data storage capacity of the medium likewise increases. However, as the number of data tracks increases, the tracks usually become narrower and more crowded on the medium surface. Accordingly, an increase in the number of data tracks can make positioning of the transducer head relative to a desired data track more challenging. In particular, for proper data storage and recovery, the transducer head must locate each data track, and follow the path of the data track accurately along the media surface. In order to facilitate precise positioning of the transducer head relative to the data tracks, servo techniques have been developed.

Servo marks refer to signals, patterns or other recorded markings on the medium that are used for tracking purposes. In other words, servo marks are recorded on the medium to provide reference points relative to the data tracks. A servo controller may interpret detected servo marks and generate position error signals. The position error signals are used to adjust the lateral distance of the transducer head relative to the data tracks so that the transducer head is properly positioned along the data tracks for effective reading and/or writing of the data.

With some data storage media, such as magnetic tape, the servo marks are stored in specialized tracks on the medium, called "servo tracks." Servo tracks serve as references for the servo controller. Conventional servo tracks typically hold no data except for information that is useful to the servo controller to identify positioning of a transducer head relative to the surface of the medium.

The servo marks recorded in the servo tracks may be sensed by one or more servo heads. For example, servo heads may be dedicated heads that read only servo marks in the servo tracks. Once a particular servo track is located by the servo head, a data track can be located on the medium according to the data track's displacement from the servo track. The servo controller receives detected servo signals from the servo heads, and generates position error signals, which are used to adjust positioning of a transducer head relative to the data tracks.

Time-based servo techniques refer to servo techniques that make use of time variables. Time-based servo techniques are particularly effective for magnetic tape, which typically feeds past transducer heads at a constant velocity. For example, N-shaped servo markings, servo markings such as "<<< >>>" or "//// \\\\," or the like, have been developed for time-based servo techniques. Such markings are typically formed in a servo track of the magnetic tape.

When time-based servo techniques are used, the time offset between detection of two or more servo marks can be translated into a position error signal, which defines a lateral distance of the transducer head relative to a data track. For example, given a constant velocity of magnetic tape formed with marking "/ \", the time between detection of "/" and "\" becomes larger when the servo head is positioned towards the bottom of marking "/ \" and smaller if the servo head positioned towards the top of marking "/ \". Given a constant velocity of magnetic tape, a defined time period between detected servo signals may correspond to a center of marking "/ \". By locating the center of marking "/ \", a known distance between the center of the servo track and the data tracks can be identified.

SUMMARY

In general, the invention is directed to servo techniques that make use of sequences of servo marks, rather than individual marks for time-based servo tracking. In particular, random or psudo-random sequences of servo marks may be recorded on the medium in an overlapping fashion. For example, a first sequence of marks and a second sequence of marks may overlap in the servo track. The second sequence may be substantially non-correlated with the first sequence, and may be recorded in an offset location along the track relative to the first sequence. Different correlators can be used to detect the different sequences, and position error signals can be generated based on timings associated with the detection of the first sequence relative to the second sequence.

In some cases, additional sequences may also be used, e.g., third sequences, fourth sequences, and so forth. In that case, different correlators can be used to detect the different sequences, and position error signals can be generated based on timings associated with the detection of the first sequence relative to one of the other sequences. Non-servo data such as linear positioning (LPOS) information may be encoded in the servo track based on which of the first, second, third or fourth sequences is used for servo tracking at any given time.

In one embodiment, the invention provides a data storage medium including a servo track, the servo track comprising a first sequence of servo marks and a second sequence of servo marks at least partially overlapping the first sequence and oriented different from the first sequence.

In another embodiment, the invention provides a magnetic tape comprising a servo track and at least one data track. The servo track may include a set of first sequences of servo marks oriented in a first angle relative to the servo track, and a set of second sequences of servo marks having lengths substantially the same as the first sequences, overlapping at least some of the first sequences, and oriented in a second angle relative to the servo track. The second angle may be different from the first angle, and, in some cases, the first and second angles define opposite azimuths of one another relative to a line perpendicular to the servo track.

In another embodiment, the invention provides a method. The method may comprise detecting a first sequence of servo marks recorded on a data storage medium, detecting a second sequence of servo marks recorded on the data storage medium in an at least partially overlapping manner relative to the first sequence, and generating a position error signal based on timing associated with the detection of the first and second sequences. The method may be performed by a servo unit of a magnetic data storage system.

In another embodiment, the invention provides a method comprising recording first sequences of servo marks on a servo track at a first orientation relative to the servo track, and recording second sequences of servo marks on the servo track to overlap at least some of the first sequences, the second sequences being oriented in a second orientation relative to the servo track, the second orientation being different from the first orientation. In that case, the method may be performed by a servo recording system.

In another embodiment, the invention provides a system comprising a transducer head to read or write data on a data storage medium, a controller to control positioning of the transducer head relative to the data storage medium, and a servo unit to provide position error signals to the controller. The servo unit may include a first correlator to detect first sequences of servo marks recorded on the data storage medium, a second correlator to detect second sequences of servo marks recorded on the data storage medium in an at least partially overlapping manner relative to the first sequences, and a signal generator to generate the position error signals based on timing associated with the detection of the first and second sequences.

In another embodiment, the invention provides a system comprising a first servo head that records a first sequence of servo marks in a servo track of a data storage medium, and a second servo head that records a second sequence of servo marks in the data storage medium at least partially overlapping the first sequence and oriented different from the first sequence.

The invention may be capable of providing one or more advantages. For example, use of sequences of markings can improve signal-to-noise ratios relative to time-based servo techniques that use individual markings. Improved signal-to-noise ratios may be particularly important with reductions in the width of servo tracks. The invention may also reduce or eliminate problems caused by recording errors or drop-outs. In particular, whereas dropout of a conventional marking may make servo tracking ineffective for that given marking, dropout of one or more markings in a sequence of markings, used in accordance with the invention, may still allow for the occurrence of sequence to be identified.

In addition, in conventional servo tracking techniques that use individual markings, loss of synchronization may occur as a result of dropouts or recording errors. In that case, the system may have difficulty identifying whether a current marking corresponds to positive or negative azimuth. Thus, by eliminating problems associated with dropout, the invention can also avoid problems associated with loss of synchronization. Yet another advantage of the invention involves the ability to store non-servo data within the servo markings. For example, different sequences may be used at different times to provide servo tracking capabilities, and also to encode non-servo data, e.g., based on what sequence is currently being used. Such encoded non-servo data in the servo track may be particularly useful to encode LPOS information that defines a current location within a strand of magnetic tape.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

In FIG. 5A, one of the first sequences is made bold, and in FIG. 5B, one of the second sequences is made bold.

DETAILED DESCRIPTION

The invention is directed to servo techniques that make use of sequences of servo marks, rather than individual marks for generation of position error signals. In particular, random or psudo-random sequences of servo marks may be recorded on the medium in an overlapping fashion. For example, a first sequence of marks and a second sequence of marks may overlap in the servo track. The second sequence may be substantially non-correlated with the first sequence, and may be recorded in an offset location along the track relative to the first sequence. Different correlators can be used to detect the different sequences, and position error signals can be generated based on timings associated with the detection of the first sequence relative to the second sequence.

Figure 1:
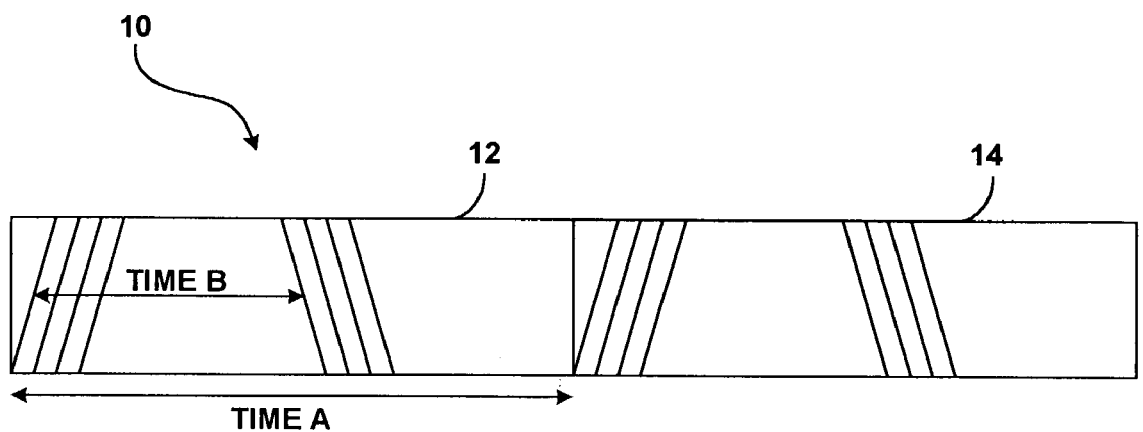
FIG. 1 is a conceptual diagram illustrating a prior art servo track.

FIG. 1 is a conceptual diagram illustrating a prior art servo track 10. Two frames 12 and 14 of servo track 10 are illustrated. Time-based servo techniques making use of individual markings 12, 14 as illustrated in FIG. 1, have been used for magnetic tape to facilitate positioning of a transducer head relative to data tracks. The data tracks may reside a known distance from servo track 10. Thus, by locating a position of a servo head relative to servo track 10, a position error signal can be generated to identify lateral positioning error of the transducer head relative to the data track(s).

In conventional time-based servo techniques, servo marks may comprise individual marks such as "//// \\\\" as illustrated in FIG. 1, other individual marks such as "<<< >>>" or N-shaped marks. As illustrated in FIG. 1, time (A) represents the time associated with one servo frame, whereas time (B) represents the time between two specific servo marks, in this case, the time between detection of marks 12 and 14. Time (A) is generally fixed, regardless of the lateral positioning of a servo head that detects the markings.

However, time (B) changes depending on such positioning. For example, time (B) becomes larger as servo head positioning is moved towards the bottom of servo track 10. Given a constant speed of magnetic tape formed with servo track 10, time (B) can be used to generate one or more position error signals. Alternatively, the ratio of time (B) to time (A) can be used to generate one or more position error signals. In the later case, time (A) can normalize the ratio to account for any variance in tape speed.

Conventional time-based servo markings such as that illustrated in FIG. 1, however, encounter a number of problems and shortfalls. For example, individual markings used for servo tracking purposes may yield relatively poor signal-to-noise (S/N) ratios, which can affect-performance. Signal-to-noise ratios can also be negatively affected as the size or widths of servo tracks become smaller.

Moreover, defects or recording errors associated with individual markings can cause problems in servo tracking. For example, recording errors (sometimes called dropouts) may eliminate the presence of one or more markings, which can negatively impact the detected timings. In some cases, a single dropout associated with loss of only one mark can cause errors due to loss of synchronization. In that case, a marking associated with one azimuth may be confused with a marking of the other azimuth. These and other problems exist with respect to prior art time-based servo techniques that use individual markings for servo tracking.

The invention utilizes timing based tracking concepts similar to those used in prior art systems such as that illustrated in FIG. 1. However, in accordance with the invention, sequences of servo markings perform the function conventionally associated with individual marks. In particular, use of overlapping sequences of markings, rather than individual marks can improve signal-to-noise ratios, reduce problems caused by recording errors or dropouts, and can reduce or eliminate problems associated with loss of synchronization.

Figure 2:
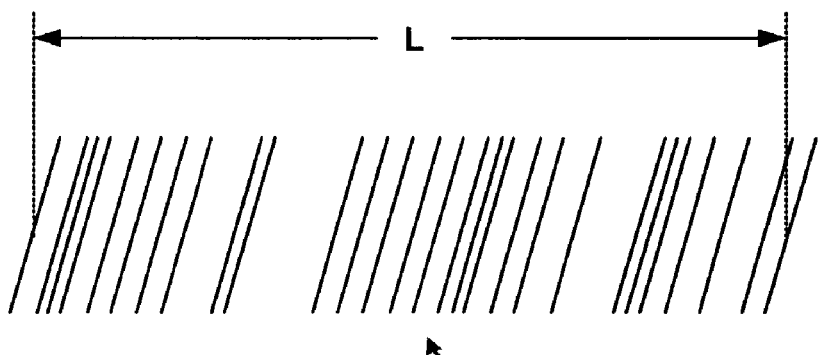
FIG. 2 is a conceptual diagram of a first sequence of markings in accordance with an embodiment of the invention.
Figure 3:
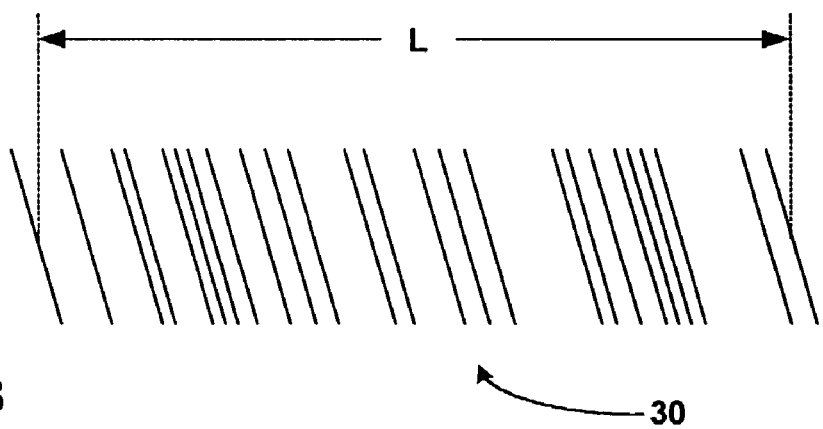
FIG. 3 is a conceptual diagram of a second sequence of markings, i.e., oriented different from the first sequence illustrated in FIG. 2.
Figure 4:
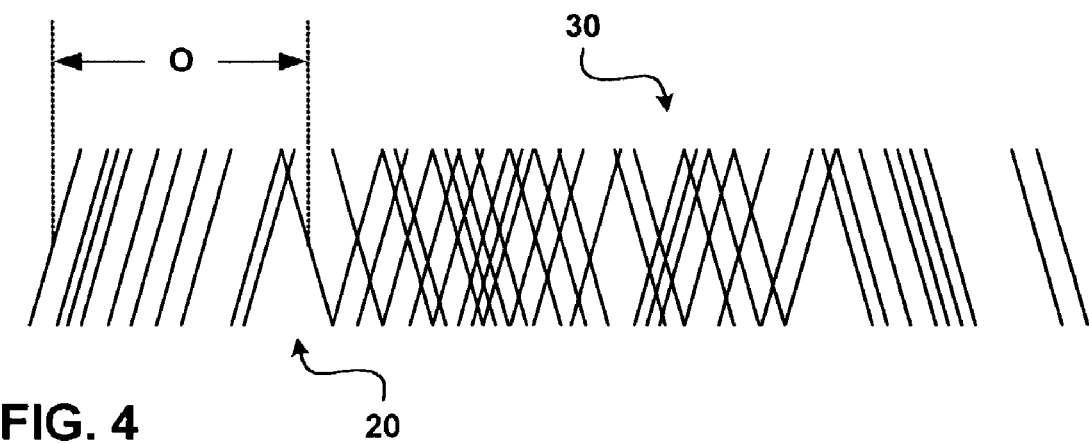
FIG. 4 is a conceptual diagram of the first sequence and the second sequence recorded in an overlapping and offset manner.

FIG. 2 is a conceptual diagram of a first sequence of markings 20 in accordance with an embodiment of the invention. FIG. 3 is a conceptual diagram of a second sequence of markings 30. FIG. 4 is a conceptual diagram of the first sequence 20 and the second sequence 30 recorded in an overlapping and offset manner. First sequence 20 and second sequence 30 may each define a length (L) that is the same for both sequences 20, 30. The detection of first sequence 20 and detection of second sequence 30 may be viewed as analogous to conventional detection of a frame, e.g., detection of time (A) of FIG. 1.

The markings of sequence 20 may be oriented different from the markings of sequence 30. In particular, the markings of sequence 20 may define an angle relative to the servo track that is different from the markings of sequence 30. More specifically, the markings of sequence 20 and sequence 30 may have opposite azimuths of one another relative to a line perpendicular to the servo track. As used in this disclosure, the phrase opposite azimuths refers to markings respectively defining positive and negative angles relative to a line perpendicular to the servo track. For example, the sequences of marks "/// //" and "\ \\ \\\" have opposite azimuths, whereas the sequences of marks "/// //" and "/ // / /" have the same azimuths. The absolute values of the positive and negative angles defined by marks of opposing azimuths may be the same or different for the various sequences, depending on implementation.

Detection of the lateral distance or offset (O) between first sequence 20 or second sequence 30 may be viewed as analogous to conventional detection of the distance between two opposite azimuth markings, e.g., detection of time (B) of FIG. 1. Thus, at its most basic level, the current invention can be viewed as an extension of conventional time-based servo techniques in which sequences 20 and 30 perform the function conventionally performed by individual marks 12, 14 (FIG. 1). As described in greater detail below, use of sequences of markings can provide a number of advantages including improved signal-to-noise ratios, reduced problems caused by recording errors or dropouts, reduced problems associated with loss of synchronization, and even the ability to store non-servo data within the servo markings.

Sequence 20 and sequence 30 may be pre-selected to be substantially non-correlated with one another. The phrase "substantially non-correlated" means that a correlator, such as a matched correlation filter designed for detection of the first sequence has little or no response to the second sequence, and vice versa. Put another way, the first and second sequences are mathematically orthogonal to one another. Accordingly, a first correlator can detect the first sequence without being affected by an overwritten second sequence, and a second correlator can detect the second sequence without being affected by the first sequence. The respective correlators may generate signals upon detecting the last pulse of a given sequence. Timing between detected sequences, then, can be used to generate position error signals used for servo tracking.

Figure 5A:
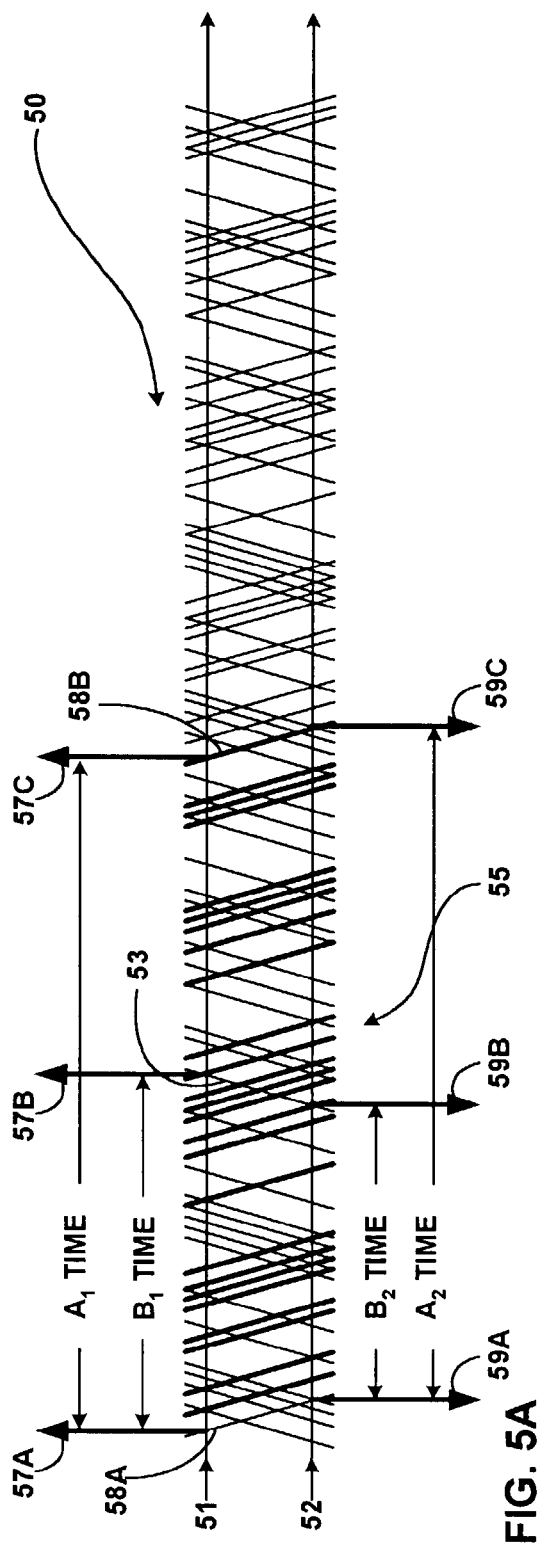
FIGS. 5A and 5B are substantially identical conceptual diagrams of a servo track in accordance with an embodiment of the invention, illustrating a first sequence of servo marks and a second sequence of servo marks written in an overlapping fashion.
Figure 5B:
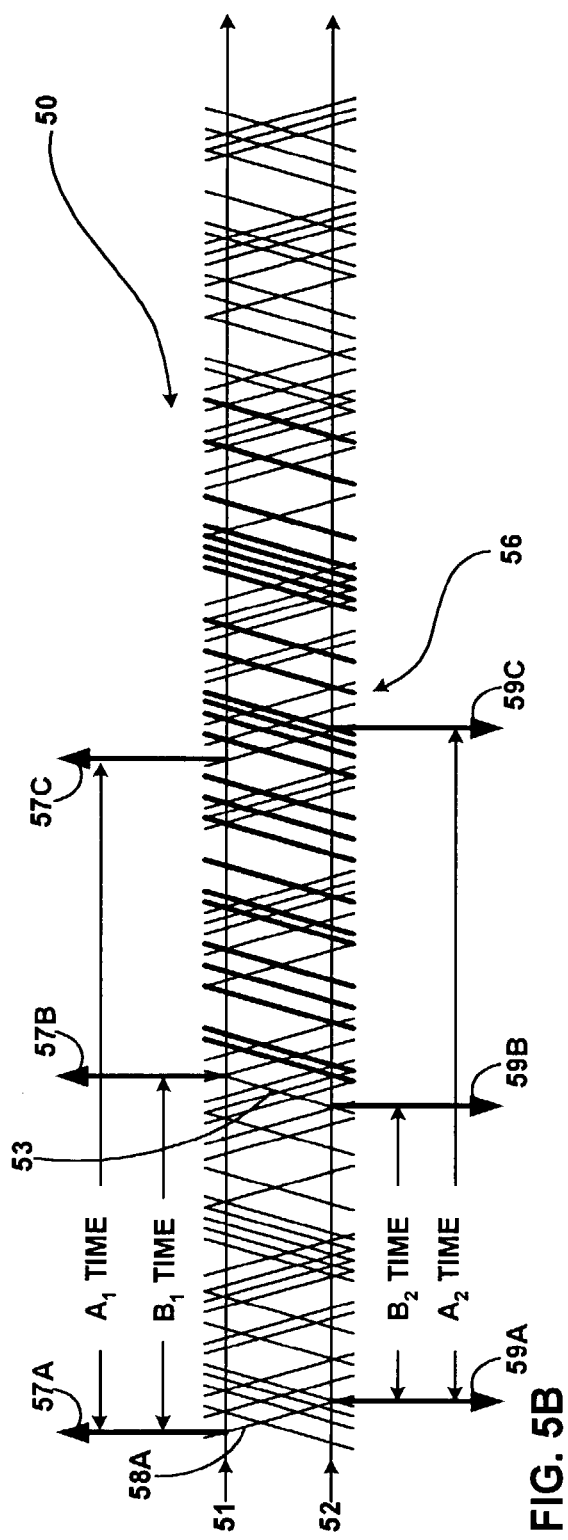

FIGS. 5A and 5B are substantially identical conceptual diagrams of a servo track 50 in accordance with an embodiment of the invention, illustrating a first sequence of servo marks and a second sequence of servo marks written in an overlapping fashion. For purposes of clarity, in FIG. 5A one of the first sequences 55 is made bold, and in FIG. 5B one of the second sequences 56 is made bold. In practice, sets of the first and second sequences may be written along servo track 50 in a repeating fashion. The second sequence 56 may be offset relative to the first sequence, e.g., by half the length of a sequence, although the invention is not limited in that respect.

A servo head passes over servo track 50, and detects each individual marking. The servo head may have a width much smaller than the markings of sequences 55, 56. Pulses may be generated with the detection of each marking, and the pulses can be fed into respective correlators designed to respectively recognize the first sequence 55 and the second sequence 56. Again, however, because of non-correlation between sequences 55, 56, the correlator designed to identify one sequence will not be substantially responsive to the other sequence and vice versa. Accordingly, the sequence 55 can be distinguished from sequence 56. Sequence 55 and sequence 56 may be pre-selected to be substantially non-correlated such that each respective correlator detects one sequence, but is unaffected by the other.

Arrows 51 and 52 respectively illustrate two possible paths of a servo head passing over servo track 50. For example, when a servo head passes over servo track 50 at arrow 51, signals 57A, 57B and 57C are generated. Signal 57A is generated upon detection of the last marking 58A of the first sequence, and signal 57C is generated upon subsequent detection of the last marking 58B of the first sequence. Signal 57B is generated upon detection of the last marking 53 of the second sequence.

Similarly, when a servo head passes over track 50 at arrow 52, signals 59A, 59B and 59C are generated. In that case, signal 59A is generated upon detection of the last marking 58A of the first sequence, signal 59B is generated upon detection of the last marking 53 of the second sequence, and signal 59C is generated upon subsequent detection of the last marking 59B of the first sequence.

Signals 57A, 57B and 57C, or signals 59A, 59B and 59C can be used as timing information that can pinpoint lateral location of the servo head relative to servo track 50. In particular, signals 57A, 57B and 57C can define times ($A_1$) and ($B_1$), and similarly, signals 59A, 59B and 59C can define times ($A_2$) and ($B_2$). The values of times ($B_1$) or ($B_2$), or the ratios of ($B_1/A_1$) or ($B_2/A_2$) can be used to define the lateral location of the servo head relative to servo track 50. The values of ($A_1$) and ($A_2$) are generally constant and equal to one another. Thus, as the value of (B) changes, so does the value of the ratio (B/A) in a linear fashion. Use of ratio (B/A) provides the advantage of normalizing the value (A) to compensate for any variations in linear tape speed.

In one example, sequence 56 is recorded at an offset location relative to sequence 55, and the offset location may correspond to one-half of the length of either sequence 55 or 56. In that case, the ratio (B/A) would be approximately 0.5 when the servo head passed over the center of servo track 50. Accordingly, in that case ($B_1/A_1$) would define a value larger than 0.5 and ($B_2/A_2$) would define a value smaller than 0.5. Depending on the value of this ratio, position error signals can be generated and provided to a controller of a transducer head that passes over the data tracks so that the transducer head can be properly positioned in accordance with the position error signals. The data tracks may be displaced from servo track 50 by a known distance. Accordingly, the location of a servo head relative to servo track 50 may have a linear relationship with the location of a transducer head relative to the data tracks. Thus, position error signals generated based on detection of the overlapped sequences in servo track 50 can be used to properly adjust positioning of a transducer head.

By way of example, the sample rate of the generation of position error signals may be on the order of 20,000 position error signals per second. For example, each sequence may span approximately 200 microns in length allowing for approximately 5000 position error signals per meter of tape. In that case, at a tape speed of four meters per second, approximately 20,000 position error signals would be generated each second. The invention, however, may find use with other tape speeds, other sequence lengths, and indeed, other media formats as well.

Figure 6:
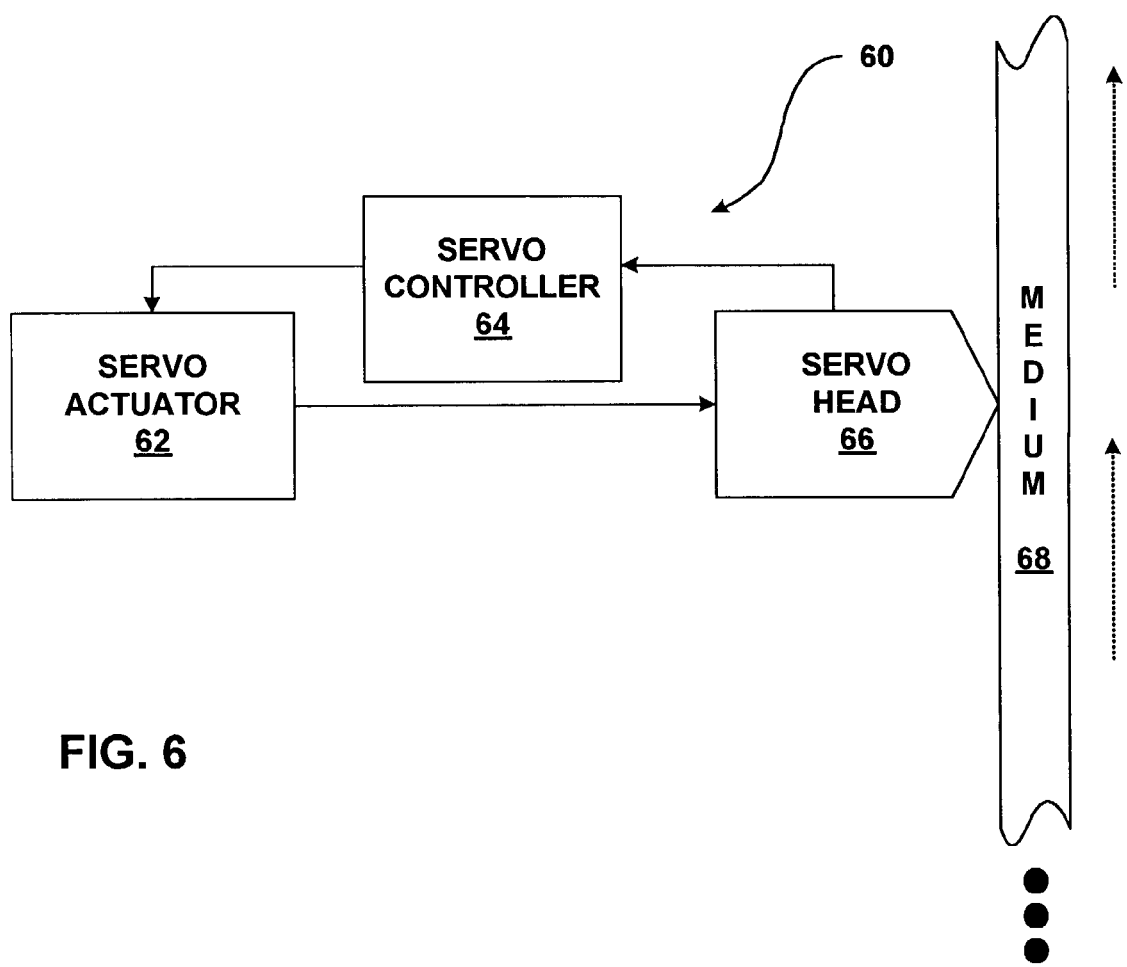
FIG. 6 is a block diagram illustrating an exemplary servo system according to an embodiment of the invention.

FIG. 6 is a block diagram illustrating an exemplary servo system 60 according to an embodiment of the invention. System 60 includes a servo actuator 62, a servo controller 64, a servo head 66, and a medium 68. In the exemplary embodiments described herein, medium 68 may comprise a magnetic tape, although the invention is not necessarily limited for use with magnetic tape. In any case, medium 68 includes a servo track comprising a first sequence of servo marks, and a second sequence of servo marks at least partially overlapping the first sequence and oriented different from the first sequence. Servo head 66 detects the sequences, and based on the sequences detected by servo head 66, servo controller 64 generates position error signals. Specifically, servo controller 64 generates the position error signals based on timing associated with detection of the sequences as outlined herein. In addition, servo controller 64 provides output signals to servo actuator 62, which controls and modifies positioning of servo head 66 relative to data tracks of medium 68.

For example, referring to FIGS. 5A and 5B and FIG. 6, medium 68 may include servo track 50, as well as one or more data tracks (not shown). The data tracks are located a known lateral distance from the center of servo track 50. Servo head 66 detects sequences 55, 56 and servo controller 64 generates signals 57A–57C or signals 59A–59C. Based on the ratio of times (B/A), servo controller 64 generates position error signals and provides the output to servo actuator 62. Servo actuator 62 uses the output signals from servo controller 64 to define or modify positioning of servo head 66 relative to data tracks of medium 68. Servo head 66 may have a width that is substantially smaller than the width of servo markings in the sequences.

Figure 7:
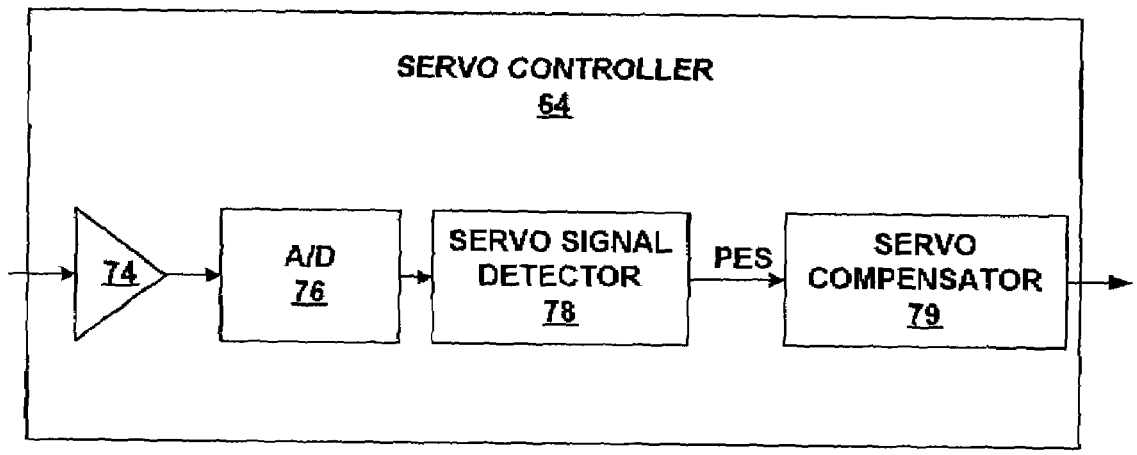
FIG. 7 is a block diagram of an exemplary servo controller according to an embodiment of the invention.

FIG. 7 is a more detailed block diagram of an exemplary servo controller 64. Servo controller 64 may include one or more signal conditioning components such as amplifier 74, and one or more filters (not shown). Analog-to-digital (A/D) converter 76 receives a detected analog signal and samples to the signal to generate digital samples of the signal. Servo signal detector 78 receives the digital samples and identifies sequences of detected servo marks in accordance with the invention for time-based servo tracking. By way of example, servo signal detector 78 may comprise a digital signal processor (DSP), a general purpose microprocessor, an application specific integrated circuit (ASIC), a field programmable gate array (FPGA), various components of hardware or firmware, or the like. Servo signal detector 78 provides position error signals to servo compensator 79. Servo compensator 79, in turn, uses the position error signals to generate output to servo actuator 62 (FIG. 6) in order to adjust positioning of servo head 66 relative to medium 68.

Figure 8:
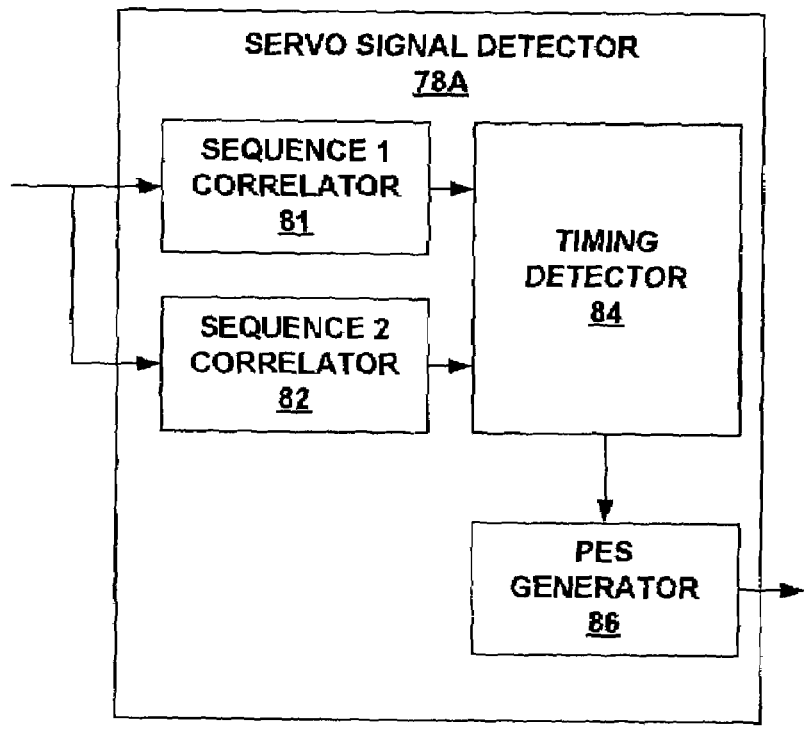
FIG. 8 is block diagram of an exemplary servo signal detector according to an embodiment of the invention.

FIG. 8 is a more detailed block diagram of an exemplary servo signal detector 78A, which may correspond to servo signal detector 78 of FIG. 7. As illustrated in FIG. 8, servo signal detector 78A may include two or more sequence correlators 81, 82, which may comprise matched filters. Sequence 1 correlator 81 is designed relative to a first sequence of servo marks such that sequence 1 correlator 81 can detect the occurrence of a first sequence of servo marks. Similarly, sequence 2 correlator 82 is designed relative to a second sequence of servo marks such that sequence 2 correlator 82 can detect the occurrence of a second sequence of servo marks. Importantly, correlators 81, 82 are generally non-responsive to the occurrence of the other sequence. In other words, sequence 1 correlator 81 does not detect the occurrence of a second sequence of servo marks and sequence 2 correlator 82 does not detect the occurrence of a first sequence of servo marks. Put another way, the first and second sequences are non-correlated from the perspective of correlators 81, 82.

For example, referring to FIGS. 5A, 5B, 7 and 8, sequence 1 correlator 81 is designed to detect sequence 55 whereas sequence 2 correlator 82 is designed to detect sequence 56. Servo head 66 (FIG. 6) has a width that is substantially smaller than the width of servo markings in the sequences 55, 56. Arrows 51 and 52 respectively illustrate two possible paths of servo head 66 relative to servo track 50. When servo head 66 passes over servo track 50 at arrow 51, signals 57A, 57B and 57C are generated, and when servo head 66 passes over track 50 at arrow 52, signals 59A, 59B and 59C are generated. Signal 57A or 59A is generated upon detection of the last marking 58A of the first sequence, signal 57B or 59B is generated upon detection of the last marking 53 of the second sequence, and signal 57C or 59C is generated upon subsequent detection of the last marking 59B of the first sequence.

Timing detector 84 uses signals 57A, 57B and 57C, or signals 59A, 59B and 59C to pinpoint lateral location of servo head 66 relative to servo track 50. In particular, timing detector 84 generates times ($A_1$) and ($B_1$) based on signals

57A, 57B and 57C, or alternatively generates times ($A_2$) and ($B_2$) based on signals 59A, 59B and 59C.

Timing detector 84 uses the values of times ($B_1$) or ($B_2$), or the ratios of ($B_1/A_1$) or ($B_2/A_2$) in order to define the lateral location of the servo head relative to servo track 50. The values of ($A_1$) and ($A_2$) are generally constant and equal to one another. Thus, as the value of (B) changes, so does the value of the ratio (B/A) in a linear fashion. Timing detector 84 typically calculates ratio (B/A) to provide the advantage of normalizing the value (A) to compensate for any variations in linear tape speed. Position error signal (PES) generator 86 receives the calculated ratio and generates position error signals, which are output to servo compensator 79. Servo compensator 79 uses the position error signals to generate output signals to servo actuator 62, which adjusts positioning servo head 66 relative to medium 68.

Servo techniques as described herein, making use overlapping sequences of markings can provide a number of advantages. For example, use of sequences of markings can improve signal-to-noise ratios relative to time-based servo techniques that use individual markings. Improved signal-to-noise ratios may be particularly important with reductions in the width of servo tracks. Whereas conventional time-based servo techniques rely on detection of individual markings, the current invention relies on detection of a plurality of markings for every sequence. The signal-to-noise ratio associated with detection of a sequence may be significantly better that a signal-to-noise ratio associated with detection of individual markings.

Servo techniques making use overlapping sequences of markings can also reduce or eliminate problems caused by recording errors or dropouts. In particular, whereas dropout of a conventional marking may make servo tracking ineffective for that given marking, dropout of one or more markings in a sequence of markings, used in accordance with the invention, may still allow for the occurrence of sequence to be identified. In other words, sequence correlators 81 and 82 (FIG. 8) may identify occurrences of sequences 55, 56 (FIGS. 5A, 5B) even if one or more marks of a given sequence 55, 56 are missing. As long as a substantial portion of the given sequence 55, 56 is present, respective correlators 81, 82 may be capable of identifying the respective sequence.

In addition, in conventional servo tracking techniques that use individual markings, loss of synchronization may occur as a result of dropouts or recording errors. In that case, the system may have difficulty identifying whether a current marking corresponds to first or second azimuth. Thus, by eliminating problems associated with dropout, the invention can also avoid problems associated with loss of synchronization.

Yet another advantage of the invention involves the ability to optionally store non-servo data within the servo markings. For example, different sequences may be used at different times to both provide servo tracking capabilities and also encode data, e.g., based on what sequence is currently being used. In other words, rather than using only first and second sequences, the invention may use first sequences, second sequences, third sequences, fourth sequences, and so forth. In that case, only two sequences may be overlapping at any given instance. The overlapping sequences at any given instance can be used to define servo tracking as outlined above. In addition, information can be stored in the servo track based on which sequences are in the overlapping manner at any given instance. Such encoded data in the servo track may be particularly useful to encode linear positioning (LPOS) information that defines a current location within a large strand of magnetic tape. In particular, encoded machine words identifying LPOS information may be encoded over the course of a number of sequences to specify locations within a strand of magnetic tape.

Figure 9:
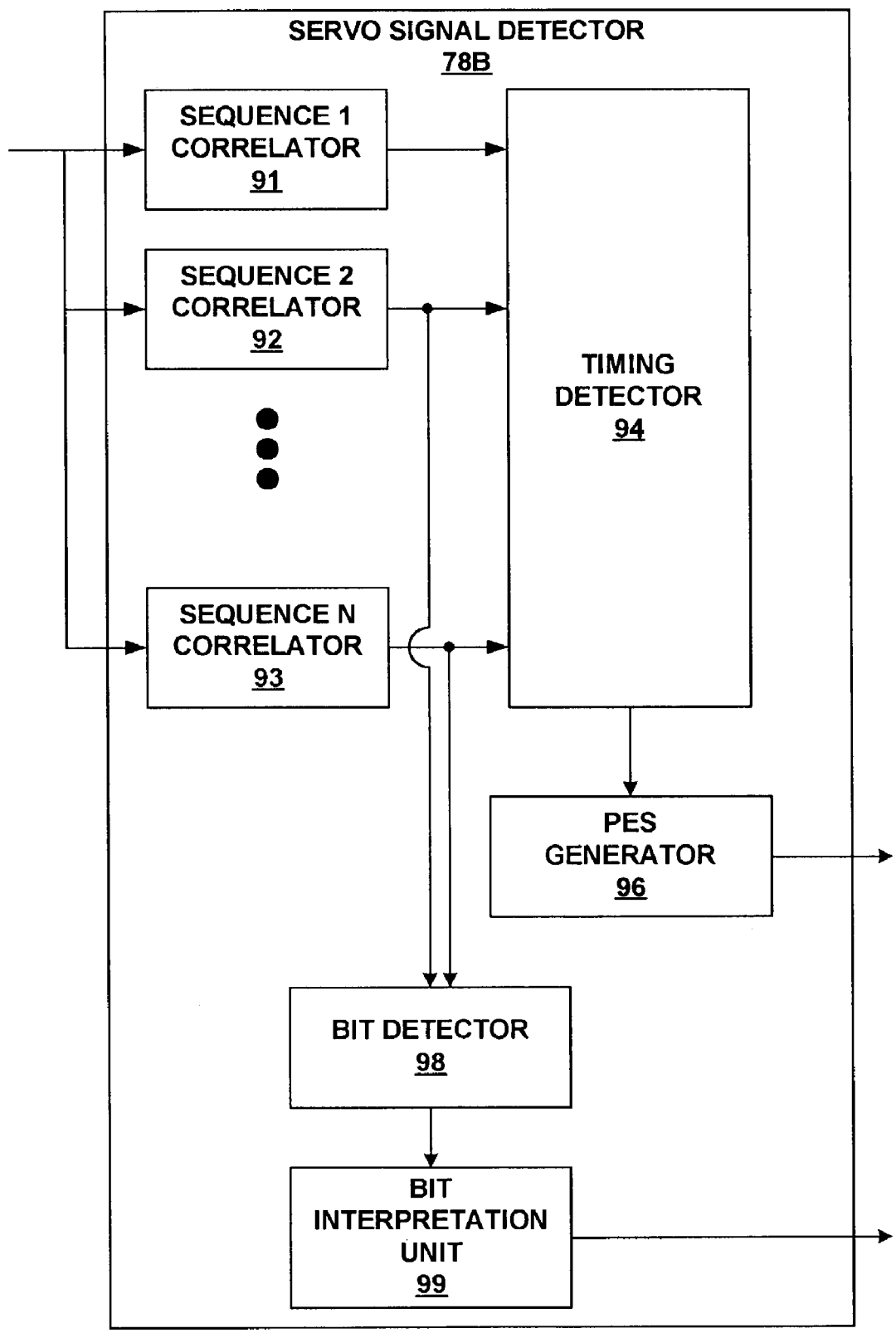
FIG. 9 is another block diagram of an exemplary servo signal detector according to an embodiment of the invention.

FIG. 9 is another exemplary servo signal detector 78B that may correspond to servo signal detector 78 of FIG. 7. In this case, servo signal detector 78B includes three or more distinct sequence correlators 91, 92, 93 that identify distinct sequences which are non-correlated relative to one another. At any given instance, two sequences of opposing azimuths are stored on the servo track. In this example, sequence 1 may define a sequence at a first azimuth that is stored substantially over the whole servo track, and the other sequences 2-N may define alternative opposing azimuth sequences individually overwritten on the first sequences.

Timing detector 94 receives detected sequence signals from sequence correlator 1, 91, and one of the other correlators 92, 93. Timing detector 94 uses signals from correlator 91 and one of the other correlators 92, 93 to pinpoint lateral location of servo head 66 (FIG. 6) relative to a servo track of medium 68. In particular, timing detector 94 generates times or ratios in a manner similar to timing detector 84 (FIG. 8) and PES generator 96 generates position error signals, which are provided to servo compensator 79 for use in generating output to servo actuator 62 to control positioning of servo head 66 relative to medium 68.

Non-servo information can be encoded in the servo signal based on which sequences are used at any given time. Again, although the invention is not limited in this respect, sequence 1 may define a sequence at a first azimuth that is stored substantially over the whole servo track, and the other sequences 2-N may define alternative opposing azimuth sequences individually overwritten on the first sequences. In that case, the output of sequence correlators 92, 93 are provided to bit detector 98. In other words, the correlators associated with the second opposing azimuth are provided to bit detector 98. Bit detector 98 generates encoded bits based on which correlator 92, 93 is being used at any given instance. Bit interpretation unit 99 interprets the meaning of the bits detected by bit detector 98. For example, bit interpretation unit 99 may accumulate bits into one or more machine words that have pre-assigned meanings. Bit interpretation unit 99 then outputs the non-servo information that was encoded in the servo track. Again, in one example, bit interpretation unit 99 generates LPOS information that is encoded by specific selection of sequences stored in the servo track.

In the example described with reference to FIG. 9, the first sequence correlated by sequence 1 correlator 91 has a first azimuth, and the other sequences correlated by one of correlators 92, 93 has a different azimuth, e.g., opposite the first azimuth. However, in other examples, a plurality of alternative non-correlated sequences may be recorded at a first azimuth and a plurality of alternative non-correlated sequences may be recorded at the second azimuth to provide even more complex encoding capabilities. In other words, different sequences can be selected for both azimuths at any given instance to provide improved encoding capabilities, i.e., more information being stored in the servo track. The two current sequences used at any given instance can provide servo tracking capabilities as outlined above, and the types of sequences used at any instance can define non-servo data stored in the servo track. Any type of non-servo data may be encoded, although LPOS information is specifically envisioned as useful prewritten information that can be stored in the servo track.

Figure 10:
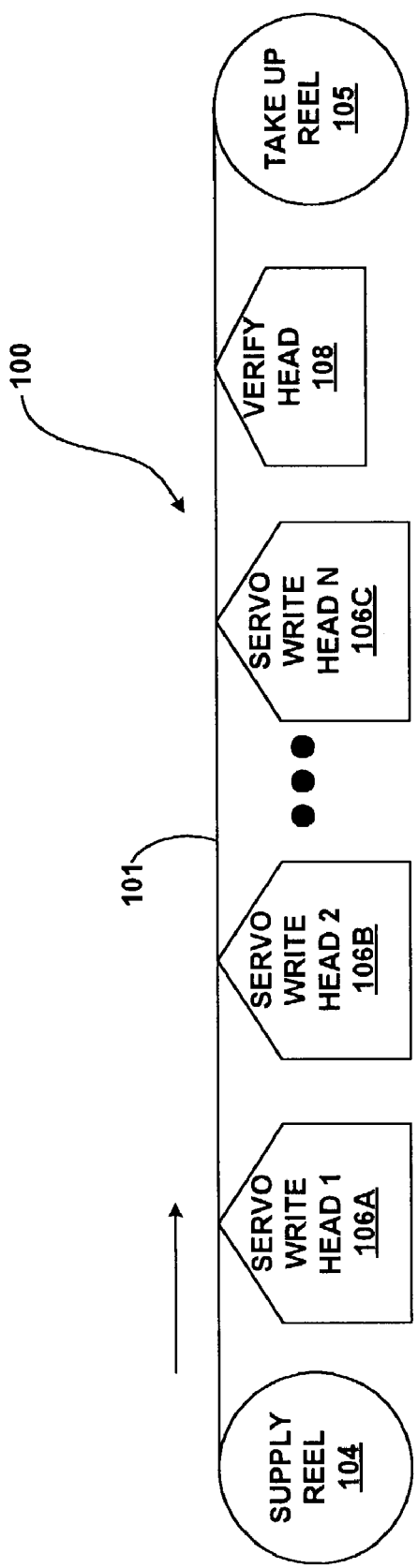
FIG. 10 is a conceptual block diagram of a servo recording system according to an embodiment of the invention.

FIG. 10 is a conceptual block diagram of a servo recording system according to an embodiment of the invention. In this example, servo recording system 100 is used to record servo patterns, as described herein, on magnetic tape 101. Magnetic tape 101 may be transferred from a supply reel 104 to a take-up reel 105. Magnetic tape 101 feeds past two or more servo write heads 106A–106C, which record overlapping sequences of servo marks on magnetic tape 101 as described herein. If non-servo data is encoded in the sequences of servo marks, specific servo write heads 106A–106C may be selectively invoked to define the desired sequences. A servo recording controller (not shown) may coordinate operation of servo write heads 106A–106C to properly define the magnetic recording of the sequences of servo patterns similar to those described herein. If desired, a verify head 108 may also be used to measure recorded servo signals in order to ensure integrity of the recorded signals.

Various embodiments of the invention have been described. Nevertheless, various modifications may be made to the description above without departing from the scope of the following claims. For example, the invention may find use in other non-tape media such as magnetic disks, magnetic hard drives, optical disks or tape, holographic media, and so forth. In some cases, the servo tracks may be non-linear, e.g., circumferential tracks that span a disk medium. Also, the invention may be implemented solely in an analog realm, without requiring conversion to digital values for signal processing. Moreover, in various embodiments, the individual markings in the sequences could have alternative shapes or formats, such as "<" or ">" shapes, or other shapes that define angles sufficient for time-based servo tracking. These and other embodiments are within the scope of the following claims.

The invention claimed is:

1. A data storage medium comprising magnetic tape and including a servo track that extends along a length of the magnetic tape, the servo track comprising:
 a first sequence of servo marks; and
 a second sequence of servo marks at least partially overlapping the first sequence and oriented different from the first sequence, wherein the first sequence is substantially non-correlated with the second sequence such that a correlator designed for detection of the first sequence has little or no response to the second sequence.

2. The data storage medium of claim 1, wherein the marks in the first sequence define first angles and the marks in the second sequence define second angles, the first and second angles defining opposite azimuths of one another relative to a line perpendicular to the servo track.

3. The data storage medium of claim 1, the servo flack further comprising a plurality of first sequences and a plurality of second sequences recorded in the servo track, the second sequences overlapping at least some of the first sequences.

4. The data storage medium of claim 3, the servo track further including a plurality of third sequences of servo marks overlapping at least some of the first sequences and oriented different from the first sequences.

5. The data storage medium of claim 4, wherein the plurality of first sequences substantially span a length of the servo track and pluralities of second and third sequences overlap the first sequences but do not overlap each other.

6. The data storage medium of claim 5, wherein the second and third sequences are arranged in the servo track with respect to each other to encode non-servo data in the servo rack.

7. The data storage medium of claim 1, wherein each of the first and second sequences span a length of the servo track, the length associated with the first sequence being the same as a length associated with the second sequence.

8. The data storage medium of claim 7, wherein the first sequence is offset relative to the second sequence.

9. The data storage medium of claim 1, wherein the data storage medium comprises magnetic tape, the magnetic tape further comprising one or more data tracks.

10. Magnetic tape comprising a servo track and at least one data track that extend along a length of the magnetic tape, the servo track including:
 a set of first sequences of servo marks oriented in a first angle relative to the servo track, and
 a set of second sequences of servo marks having lengths substantially the same as the first sequences, overlapping at least some of the first sequences, and oriented in a second angle relative to the servo track, the second angle being different from the first angle, wherein the set of first sequences is substantially non-correlated with the set of second sequences such that a correlator designed for detection of the first sequences has little or no response to the second sequences.

11. The magnetic tape of claim 11, wherein the first and second angles have opposite azimuths of one another relative to a line perpendicular to the servo track.

12. The magnetic tape of claim 10, the servo tack further including a set of third sequences of servo marks overlapping at least some of the first sequences and oriented in a third angle relative to the servo track, the third angle being different from the first angle.

13. The of claim 12, wherein the set of first sequences substantially span a length of the servo track and the sets of second and third sequences overlap the first sequences but do not overlap each other.

14. A method comprising:
 detecting with a first correlator a first sequence of servo marks recorded on a servo track of a magnetic tape medium that extends along a length of the magnetic tape medium;
 detecting with a second correlator a second sequence of servo marks recorded on the servo track of the magnetic tape medium in an at least partially overlapping manner relative to the first sequence, wherein the fast sequence is substantially non-correlated with the second sequence such that the first correlator has little or no response to the second sequence and the second correlator has little or no response to the first sequence; and
 generating a position error signal based on timing associated with the detection of the first and second sequences.

15. The method of claim 14, further comprising:
 detecting with a third correlator a third sequence of servo marks recorded on the magnetic tape medium in an at least partially overlapping manner relative to the first sequence; and
 generating a position error signal based on timing associated with the detection of the first and third sequences.

16. The method of claim 15, further comprising generating non-servo information based on detection of the second and third sequences.

17. A method of recording a servo pattern in a servo track of a magnetic tape, the servo track extending along a length of the magnetic tape, the method comprising:

recording first sequences of servo marks on the servo track at a first orientation relative to the servo track; and recording second sequences of servo marks on the servo track to overlap at least some of the first sequences, the second sequences being oriented in a second orientation relative to the servo track, the second orientation being different from the first orientation, wherein the first sequences are substantially non-correlated with the second sequence such that a correlator designed for detection of the first sequences has little or no response to the second sequences.

18. The method of claim 17, further comprising recording the first and second sequences at first and second orientations respectively having opposite azimuths of one another relative to a line perpendicular to the servo track.

19. The method of claim 17, further comprising recording third sequences of servo marks on the servo track to overlap at least some of the first sequences, the third sequences being oriented in a third orientation relative to the servo track, the third orientation being different from the first orientation.

20. The method of claim 17, further comprising selecting the first and second sequences to be substantially non-correlated with one another.

21. A system comprising:

a servo head to read or write data on a magnetic tape medium;

a servo actuator to control positioning of the transducer head relative to the magnetic tape medium; and a servo controller to provide signals to the actuator, the servo controller including:

a first correlator to detect first sequences of servo marks recorded on the magnetic tape medium;

a second correlator to detect second sequences of servo marks recorded on the magnetic tape medium in an at least partially overlapping manner relative to the first sequences; and a signal generator to generate the position error signals based on timing associated with the detection of the first and second sequences, wherein the first sequences are substantially non-correlated with the second sequences such that the correlator has little or no response to the second sequences and the second correlator has little or no response to the first sequences.

22. The system of claim 21, the servo controller further comprising a servo compensator to generate output to the servo actuator based on the position error signals.

23. The system of claim 21, the servo controller further including:

a third correlator to detect third sequences of servo marks recorded on the magnetic tape medium in an at least partially overlapping manner relative to the first sequences, wherein the signal generator generates position error signals based on timing associated with the detection of either the first and second sequences or the first and third sequences; and a bit interpretation unit to generate non-servo information based on detection of the second and third sequences.

24. A servo recording system comprising:

a first servo head that records a first sequence of servo marks in a servo track of a magnetic tape medium, the servo track extending along a length of the magnetic tape medium; and a second servo head that records a second sequence of servo marks in the magnetic tape medium at least partially overlapping the first sequence and oriented different from the first sequence, wherein the first sequence is substantially non-correlated with the second sequence.

* * * * *

UNITED STATES PATENT AND TRADEMARK OFFICE
CERTIFICATE OF CORRECTION

| | | |
|---|---|---|
| PATENT NO. | : 7,035,040 B2 | Page 1 of 1 |
| APPLICATION NO. | : 10/439579 | |
| DATED | : April 25, 2006 | |
| INVENTOR(S) | : Richard W. Molstad and Alan R. Olson | |

It is certified that error appears in the above-identified patent and that said Letters Patent is hereby corrected as shown below:

Column 11
    Line 55, "flack" should read --track--.

Column 12
    Line 4, "rack" should read --track--.
    Line 28, "claim 11" should read --claim 10--.
    Line 31, "tack" should read --track--.
    Line 48, "fast" should read --first--.

Signed and Sealed this

Twenty-fourth Day of June, 2008

JON W. DUDAS
*Director of the United States Patent and Trademark Office*